(12) United States Patent
Pentti

(10) Patent No.: US 10,009,866 B2
(45) Date of Patent: Jun. 26, 2018

(54) LOCATION-BASED MONITORING OF ENVIRONMENT AND CONTROLLING THERETO

(71) Applicant: LAHDEN 4G-SERVICE OY, Lahti (FI)

(72) Inventor: Kari Pentti, Helsinki (FI)

(73) Assignee: SENEQO OY, Helsinki (FI)

( * ) Notice: Subject to any disclaimer, the term of this patent is extended or adjusted under 35 U.S.C. 154(b) by 0 days. days.

(21) Appl. No.: 14/410,608

(22) PCT Filed: Jun. 26, 2013

(86) PCT No.: PCT/FI2013/050703
§ 371 (c)(1),
(2) Date: Dec. 23, 2014

(87) PCT Pub. No.: WO2014/001640
PCT Pub. Date: Jan. 3, 2014

(65) Prior Publication Data
US 2015/0341891 A1 Nov. 26, 2015

(30) Foreign Application Priority Data
Jun. 26, 2012 (FI) .................................. 20125721

(51) Int. Cl.
*H04W 64/00* (2009.01)
*H04W 4/021* (2018.01)
*H04W 4/04* (2009.01)

(52) U.S. Cl.
CPC ........... *H04W 64/00* (2013.01); *H04W 4/021* (2013.01); *H04W 4/043* (2013.01)

(58) Field of Classification Search
CPC ..... H04W 4/02; H04W 68/00; H04W 68/005; H04W 68/10

(Continued)

(56) References Cited

U.S. PATENT DOCUMENTS

2003/0003868 A1* 1/2003 Juurikko .............. H04B 17/318
455/41.1
2004/0006492 A1 1/2004 Watanabe
(Continued)

FOREIGN PATENT DOCUMENTS

CN 101477188 A 7/2009
CN 202019371 U 10/2011
(Continued)

OTHER PUBLICATIONS

International Search Report, dated May 8, 2014, from corresponding PCT application.
(Continued)

*Primary Examiner* — Amancio Gonzalez
(74) *Attorney, Agent, or Firm* — Young & Thompson

(57) ABSTRACT

A method for determining information for at least one mobile terminal within an area, wherein location of the at least one mobile terminal is determined within the area and measurement information from the area is retrieved from at least one sensor. The method includes a step of comparing measurement information of at least one sensor with at least one default value. In response of a detection of a mismatch of the retrieved measurement information and the default value it is determined information relevant in the location of the at least one sensor. Additionally, at least one mobile terminal residing within a predetermined distance from the location of the at least one sensor is determined and delivery of the determined information relevant in the location of the at least one sensor is initiated. A server implementing the method is also described.

14 Claims, 2 Drawing Sheets

(58) Field of Classification Search
USPC .................................. 455/41.1, 426.1, 422.1
See application file for complete search history.

(56) References Cited

U.S. PATENT DOCUMENTS

| | | | |
|---|---|---|---|
| 2006/0066452 A1* | 3/2006 | Chapman, Jr. .......... | G08B 21/16 340/632 |
| 2006/0116853 A1* | 6/2006 | Rappaport .......... | G01F 23/0061 702/182 |
| 2007/0232296 A1* | 10/2007 | Kim ....................... | H04L 67/12 455/426.1 |
| 2009/0077045 A1* | 3/2009 | Kirchmeier ............ | G06Q 10/06 |
| 2010/0280836 A1 | 11/2010 | Lu et al. | |
| 2011/0037571 A1* | 2/2011 | Johnson, Jr. ......... | G06K 7/0095 340/10.5 |
| 2012/0116608 A1* | 5/2012 | Park .................. | B60H 1/00657 701/2 |
| 2013/0343364 A1* | 12/2013 | Fuller .................... | H04W 4/02 370/338 |

FOREIGN PATENT DOCUMENTS

| KR | 20120033607 A | 4/2012 |
|---|---|---|
| WO | 2011071548 A1 | 6/2011 |

OTHER PUBLICATIONS

Finland Search Report, dated Feb. 18, 2013, from corresponding Finland application.

* cited by examiner

|  | Devicetype1 | Devicetype2 | Devicetype3 |
|---|---|---|---|
| Usertype1 | OK | OK | OK |
| Usertype2 | OK | – | – |
| Usertype3 | OK | OK | – |

LOCATION-BASED MONITORING OF ENVIRONMENT AND CONTROLLING THERETO

TECHNICAL FIELD

The invention concerns in general the technical field of environment monitoring. Especially the invention concerns utilization of mobile communications in controlling systems and/or devices on a basis of environmental information.

BACKGROUND OF THE INVENTION

Capability of determining a location of a mobile terminal has created a great variety of services for different purposes. Typically, the idea is that the location of the mobile terminal is determined and based on the location a service may be offered to the user of the mobile terminal. An example of such a service can e.g. be delivering vouchers into the stores nearby the location of the mobile terminal.

In addition to location based services intended for personal use the location information is successfully used in multiple enterprise services. The utilization of location information has offered new business opportunities as well as increased efficiency in daily operations. For example, in different kinds of fleet management services are built up on a location services. As the company is aware of the location of each its vehicle it is possible to increase efficiency by delivering instructions online to the vehicles in order to achieve an effective pick-up and delivery of packages.

However, there are still areas in which utilization of location information would increase efficiency if it were taken into use. Currently, lot of information relating to e.g. buildings is automatically collected and stored to databanks. The information is received from a variety of sensors mounted into one or multiple locations of the facility in order to measure e.g. temperature, quality of air and lightning among other things. On the basis of the measurement results there may exist a need to control the devices relating to temperature, air and lightning systems in the facility. Usually, this requires service person visiting the corresponding device in order to manually adjust it. This may cause delay in the controlling.

Similarly, in health care it would be advantageous to utilize location information of mobile terminals roaming in a hospital environment. As the health care systems are collecting information from patients it would be convenient to deliver the information as well as instructions for treatment to the mobile terminals carried by nurses.

Document WO2011/071548 A1 discloses a solution for providing transportation and parking services in a city environment. The fundamental idea in the document is based on an idea of locally operating sensor, which monitor environment and are capable of broadcasting information to mobile devices within the area.

Summarizing above, it would be advantageous if information on the measurement results as well as instructions could be widely used by persons linked, such as employees, to the facility in question. This would increase efficiency in a facility and thus improving the controlling of the devices in the facility. The challenge to implement this sort of solution is to deliver instructions to persons locating close to the devices to be controlled at a correct instant of time. The challenge is also to determine correct sensors, whose measurement results shall be taken into account in order to receive trusted information with respect to a certain location.

SUMMARY OF THE INVENTION

An objective of the invention is to present a method and a server for determining location dependent information on a basis of measurement information. Another objective of the invention is that the method and system enable a convenient way to monitor an area and deliver information to be utilized in a sub-area of the area.

The objects of the invention are reached by a method and a server as defined by the respective independent claims.

According to a first aspect, a method for determining information for at least one mobile terminal within an area is provided, wherein location of the at least one mobile terminal is determined within the area and measurement information from the area is retrieved from at least one sensor wherein the location of the sensor is known. In the method the retrieved measurement information of at least one sensor is compared with at least one default value stored in a database for the at least one sensor and in response of a detection of a mismatch of the retrieved measurement information of at least one sensor with at least one default value stored in a database for the at least one sensor. Information relevant in the location of the at least one sensor, whose measurement information is detected to mismatch with at least one default value stored in the database for the at least one sensor, is determined. At least one mobile terminal residing within a predetermined distance from the location of the at least one sensor whose measurement information is detected to mismatch with at least one default value stored in the database for the at least one sensor is determined and delivery of the determined information relevant in the location of the at least one sensor, whose measurement information is detected to mismatch with at least one default value stored in the database for the at least one sensor, to the at least one mobile terminal residing within a predetermined distance from the location of the at least one sensor, whose measurement information is detected to mismatch with at least one default value stored in the database for the at least one sensor, is initiated.

Further, a profile may be defined for at least one sub-area of the area. The profile for at least one sub-area of the area may comprise at least one identifier for at least one sensor by means of which measurement information on the at least one sensor may be retrieved. The default value for the at least one sensor may be retrieved from the database on the basis of the at least one identifier in the profile for at least one sub-area of the area.

A predetermined margin may be defined for the retrieved measurement information with respect to the default value in order to judge a mismatch in the comparison step of the method.

An identifier of a user of the mobile terminal may be received from the mobile terminal. Control information with respect to a device residing within a predetermined distance from the location of the at least one sensor whose measurement information is detected to mismatch with at least one default value stored in the database for the at least one sensor may be defined at least partly on a basis of the identifier of the user of the mobile terminal.

In response of a detection of a mismatch of the retrieved measurement information of at least one sensor with at least one default value stored in a database for the at least one sensor the monitoring of the at least one sensor may be initiated more frequently.

A predetermined delay may be defined after the detection of mismatch in the comparison before information to be delivered to the mobile terminal is determined.

The determination of at least one mobile terminal residing within a predetermined distance from the location of the at least one sensor whose measurement information is detected to mismatch with at least one default value stored in the database for the at least one sensor may further comprise a step of determining a presence information of the mobile terminal.

According to a second aspect, a server comprising a processing unit and memory unit including computer program code, is provided wherein the server is configured to determine information for at least one mobile terminal within an area, wherein location of the at least one mobile terminal is determined within the area and measurement information from the area is retrieved from at least one sensor wherein the location of the sensor is known. Further, the memory unit and the computer program code configured to, with the processing unit, cause the server at least to perform compare the retrieved measurement information of at least one sensor with at least one default value stored in a database for the at least one sensor and in response of a detection of a mismatch of the retrieved measurement information of at least one sensor with at least one default value stored in a database for the at least one sensor; determine information relevant in the location of the at least one sensor, whose measurement information is detected to mismatch with at least one default value stored in the database for the at least one sensor; determine at least one mobile terminal residing within a predetermined distance from the location of the at least one sensor, whose measurement information is detected to mismatch with at least one default value stored in the database for the at least one sensor; initiate delivery of the determined information relevant in the location of the at least one sensor, whose measurement information is detected to mismatch with at least one default value stored in the database for the at least one sensor, to the at least one mobile terminal residing within a predetermined distance from the location of the at least one sensor whose measurement information is detected to mismatch with at least one default value stored in the database for the at least one sensor.

The server may be configured to store a profile for a subarea of the area, the profile comprising at least an identifier for the at least one sensor.

The server may further be configured to determine information to be delivered to the at least one mobile terminal on the basis of identifier of the user received from the at least one mobile terminal.

The server may also be configured to determine a presence information of the mobile terminal residing within a predetermined distance from the location of the at least one sensor whose measurement information is detected to mismatch with at least one default value stored in the database for the at least one sensor.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

In general, the invention relates to a method for determining location based user instructions. In order to avoid any misunderstanding of the invention the inventive idea is now described by applying it for determining control information to at least one device. The device into which the control information is to be determined is a device that is involved in maintenance of a building or any other area. The maintenance in this respect refers to any technology relating to environmental comfort within the area. Such technologies are e.g. HPAC (heating, plumbing, air-conditioning) and lighting, which in general relates to energy efficiency of a building, for example. In the following description it is mainly referred to tasks relating to controlling of temperature in a building having sub-areas. However, the inventive idea as to be described is directly applicable to any other similar environment.

Figure 1:
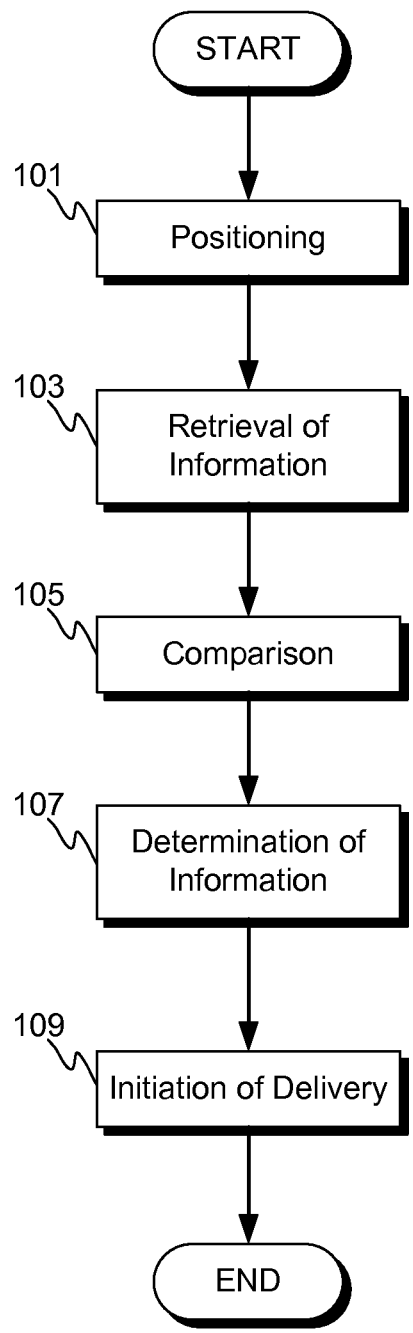
FIG. 1 illustrates a method according to an embodiment of the invention.

The method for determining control information with respect to at least one device is now described by referring to FIG. 1. As a starting point for the invention is that a parameter controllable by the at least one device is measured within one or multiple locations in a building. The measurement of the parameter is performed at least partly with one or more sensors installed in known locations. Furthermore, one or more devices are installed the building in order to control e.g. a temperature of different areas, i.e. sub-areas, within the building. Additionally, as the building is in use there are one or more persons roaming around the building carrying mobile terminals with them.

According to the invention a location of at least one mobile terminal is determined 101 within the area, such as a building. The determination can be done with any applicable manner applied for positioning. Some examples of indoor positioning can be based on a utilization so called anchors, which are either active or inactive in nature and capable of communicating with the mobile terminal. More specifically, an anchor can be a passive RFID tag, which can be activated by a mobile terminal broadcasting radio frequency close enough to the tag. The mobile terminal may e.g. read an identifier of the tag and deliver it to the central system, such as a server, through a wireless communication system, for example. Alternatively or in addition the activation of the tag may cause the tag to perform some processing with or without information stored in a memory of the tag in order to indicate the identity of the tag to the mobile terminal. In this manner, the server is capable of determining the location of the mobile terminal on the basis of tag identity. Furthermore, the tags may be active in nature and connected directly to the server and informing the server on any mobile terminals detected by them. By installing the tags as described to desired locations and with sufficient coverage it is possible to adjust the accurately of the positioning according to needs. Similarly, the positioning of the mobile terminals within a building may be based on a detection of a base station into which the mobile terminal is connected to when roaming in the building. For example, if the mobile terminal supports WLAN (Wireless Local Area Network) technology, it may happen that the mobile terminal is served by multiple WLAN base stations, when roaming in the building. Depending on the application area this kind of positioning principle may be exact enough. Furthermore, any other positioning technology can be used in order to determine the location of the mobile terminal within the area in question. In addition, it may be needed to deliver an identifier of the mobile terminal, or the user of it, in the context of the positioning step in order to utilize the information in the further steps of the invention. Such an identifier can for example be so called MAC (Media Access Control) address which is an unique identifier assigned to any hardware, such as network interface card, in order to provide identification of a mobile terminal, for example. The MAC address may be delivered to the central system by utilizing any short range radio communication technology, such as Bluetooth. Furthermore, some other identification methods may also be utilized, such as identifying the profile on a device basis, user identification with credentials (user name and/or password), biometric identification, IMEI (International Mobile Equipment Identity).

Measurement information originating from the at least one sensor within the area is retrieved 103. The measurement information may be retrieved from a database if the system is configured to collect information from at least one sensor residing in the area. The collection of information from the at least one sensor may be arranged in such a manner that the information is retrieved regularly or continuously and stored in a database. Alternatively or in addition, the measurement information may be directly retrieved from at least one sensor locating in the vicinity of the location of the mobile terminal. According to some further embodiments of the invention information may be retrieved from multiple sensors within a broader area in order to get even better understanding on the status of the area. According to still some other embodiments of the invention the mobile terminal itself may operate as a mobile sensor providing at least part of the information required by the system. Alternatively or in addition there can also be used other mobile sensors, such as sensors implemented in the wrist band of a person residing in the building.

To retrieve the most relevant information from a sub-area or the area it is possible to predetermine so called profiles for different locations. The profiles advantageously comprise information on one or more sensors, such as identifiers, on which sensors information is to be retrieved if the mobile terminal locates within the location corresponding the profile. Additionally, the location profiles may comprise information on the devices, such as heating elements, which affect the measured parameter within the location. The implementation of at least one profile may be performed by using HTML5 markup language for structuring and presenting content in WWW environment.

The step of retrieval of information 103 may also comprise an action of retrieving at least one default value for the at least one sensor. The default value is a value that is pre-defined as an optimal or desired value for measurement result of the sensor in question. For example, a sub-area A, B, C, D may have a pre-defined default value 22° C. for a temperature sensor within a corresponding location. The pre-defined default value for each of the sensor is advantageously stored in a database. The default value may be the same for at least some of the sensors or specific for each of the sensor. In addition, one or more default values may be stored in the location profiles disclosing the default values for each of the sensor included in the location profile.

According to the invention the retrieved measurement value of at least one sensor is compared 105 to the default value for the corresponding sensor(s). If a mismatch of the retrieved measurement information of at least one sensor and the at least one default value for the at least one sensor is detected, information, such as control information, is determined 107, which is relevant in the location of the at least one sensor, whose measurement information is detected to mismatch with a default value for the at least one sensor. The information determined comprises for example control information for such a device, whose controlling affects the parameter measured by the at least one sensor, whose measurement information mismatches with the default value. The control information to be defined may be, for example, that the thermostat of the heating element in the location of the mobile terminal shall be decreased for 2° C. due the fact that the temperature in the sub-area is 2° C. above the default value.

Further, as the location of at least one mobile terminal within the area is monitored and thus known it is determined at least one mobile terminal residing within a predetermined distance from the location of the at least one sensor whose measurement information is detected to mismatch with at least one default value stored in the database for the at least one sensor. The predetermined distance may be dependent on the size of the area in which the method according to the invention is applied or it may be dependent on the number of mobile terminals within the area. Even further the mobile terminals taken into account in the determination may be such which are active or belongs to correct group of persons within the area.

As said, the control information is determined 107 for at least one target, such as a device. When the control information is determined a delivery of the control information to a mobile terminal, which is determined to be the most applicable for the need, is initiated 109. The delivery may be arranged by utilizing a mobile communication network if the mobile terminal is connected to it. Alternatively or in addition, the delivery of the control information may be arranged to the mobile terminal by utilizing any other data channel, e.g. by means of a specific application executed in the mobile terminal receiving information through a short range communication channel by utilizing e.g. WLAN technology. For example, the information may be delivered by SMS, MMS, email, popup message or any similar.

As the control information is delivered to the mobile terminal the user of the mobile terminal is capable of adjusting any device in the vicinity according to the instructions disclosed in the control information. In this manner it is possible to achieve real-time information on the need for adjusting devices in an area. Furthermore, a rapid adjustment of devices is possible and thus increasing comfort of persons in the area and also possible cost savings.

Figures 2, 3:
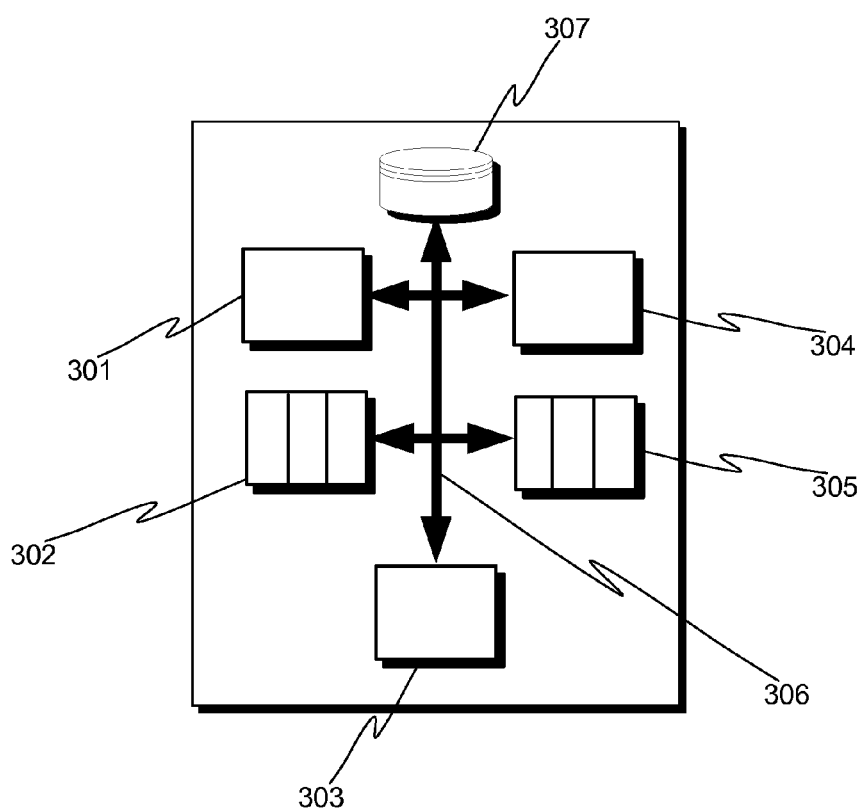
FIG. 2 illustrates a data structure according to an embodiment of the invention.
FIG. 3 illustrates a network element according to an embodiment of the invention.

Alternatively or in addition to a profile specific to an area a profile may be arranged for different users or user types of the mobile terminal. By defining a user profile in a server, for example, it is possible to determine control information according to a user or user type in a specific location. FIG. 2 illustrates an example of a data structure, which can be arranged in the server in order to define, which user types (Usertype1-Usertype3) may receive control information regarding which device types (Devicetype1-Devicetype3). Usertype1 may be a technician taking care of the area, such as a building, in general. As he or she is experienced control information to be delivered to him or her may relate to any of the device types within the area. Some examples of different types of devices may e.g. be heating devices, lightning devices and air-conditioning devices. Further, it can be defined that another type of person, e.g. cleaning woman, may receive control information relating to heating devices only (e.g. Devicetype1), but not relating to any other types of devices. Furthermore, the third type of users, such as an office clerk, may correspondingly receive control information regarding device types 1 and 2 (Devicetype1, Devicetype2). The categorization of users to different user type groups may be performed beforehand. The same can be done with respect to device types. Alternatively, both the users and/or the devices can be listed individually in the same kind of data structure as depicted in FIG. 2. The utilization of the data structure may be performed in the method step 107 as discussed above.

Furthermore, as different profiles are defined for the different users it can be arranged that the user type may be taken into account when parsing the control information for a specific user of the mobile terminal. For example, it can be arranged so that the more professional user receives more sophisticated control information than some other user even if the control information itself relates to the same controlling function.

According to some embodiment of the invention a predetermined margin is defined for the comparison 105. Namely, it can be defined in the server that if the difference between the measurement information of at least one sensor and the default value for the at least one sensor is below a predetermined margin, no any controlling in the devices in the vicinity of the at least one sensor is needed and thus no control information is defined in the server. Thus, no any delivery of control information is initiated unless it is agreed that some sort of confirmation notification is to be delivered to the mobile terminal in a specific location. The margin may be dependent on the parameter being compared as well as on the acceptable variation in the parameter measured.

According to some further embodiment of the invention it is arranged that the server receives regular updates on measurement values from at least one sensor. Further, the server is configured to compare the measured values to a default value for the corresponding sensor. If the comparison indicates mismatch, the server may be configured to initiate the monitoring of that specific sensor e.g. more frequently. If it is detected that the mismatch of values is a continuous state, the server may be configured to initiate a positioning of at least one mobile terminal in a vicinity of a device, whose operation is affecting the parameter measured. When such a mobile terminal is found, control information may be determined and the delivery of the defined information may be initiated.

Generally speaking about the positioning it may be arranged that locations of mobile terminals in the area are continuously followed in the system. This can be achieved e.g. by means of a proxy server, which is configured to convey the position information to at least one other server, which is configured to take care of the processing of the information. In addition to the position information the proxy server, or any other network node, may be configured to collect presence information of the mobile terminals within the area. This enables even a more sophisticated utilization of mobile terminals within the area than a solution which is only based on the location information. The presence information can be transmitted e.g. by means of SIP (Session Initiation Protocol). For example, even if a certain mobile terminal is determined to be within a predetermined distance from the location of the at least one sensor whose measurement information is detected to mismatch with at least one default value stored in the database for the at least one sensor it is not necessarily taken into account, when selecting the mobile terminal into which the determined information is to be delivered, if the presence information does not match with the requirements. If the mobile terminal or the application is e.g. set to inactive state it cannot be used as a receiving mobile terminal for the determined information.

Furthermore, it may be arranged that a predetermined delay is defined after the detection of mismatch in the comparison before information to be delivered to the mobile terminal is determined. This kind of embodiment enables filtering of any occasional deviation in a measurement. If an analysis of a new measurement value performed after the predetermined delay confirms the mismatch of the measured value and the default value for at least one sensor, the server may be configured to determine the control information and to initiate the delivery of it to a mobile terminal positioned in a vicinity of at least one device, whose operation is affecting the parameter measured.

Alternatively or in addition, it may be arranged to monitor if the mobile terminal into which the control information is delivered visits the location where the targets, such as devices, to be controlled are residing. A period of time can be defined for monitoring and if the mobile terminal has not visited the location, the control information can be re-delivered. Alternatively or in addition, it can be defined any other acceptable mobile terminal in a predetermined vicinity of the location of the target to be controlled and deliver the control information also to that device. One or more mobile terminals for the delivery of the control information can be defined according to predetermined criteria in order to increase the probability that the controlling of the target can be achieved.

As already mentioned the invention may be applied in many environments. For example, a hospital environment may gain great advantages of the invention. The idea could be that doctors and nurses are carrying mobile terminals communicating with at least a central computing system, managing e.g. patient information. Patient information may be retrieved from at least one sensor coupled to a patient either directly or indirectly through a monitoring device. As the mobile terminal of a doctor or nurse is positioned in a vicinity of a specific patient, patient related information may be defined at least partly on the basis of information received from the sensor coupled to the patient. As a result, instructions for treatment can be delivered to the mobile terminal of the doctor or nurse. Also in this application area it is possible to arrange user profiles, which may be different to e.g. doctors and nurses. Thus, the determination of instructions may differ from each other. In this manner, the risk of mistreatment can be reduced among other advantages. In other words, by means of such an arrangement it is always possible to direct the critical resources optimally according to needs. Furthermore, even if it is described that content to be delivered to a most appropriate user terminal according to predetermined criteria is instructions in a text form to the user of the mobile terminal, the content can be any other type of information, such as multimedia content. Additionally, the content can be pointed to the mobile terminal itself, e.g. the operation mode of the mobile terminal can be changed though internal instructions for the mobile terminal under certain circumstances. Even more sophisticated solutions can be implemented. For example, it may be arranged the by monitoring a value of at least one sensor and detecting that the value deviates from the default value over a predetermined limit, a communication connection is to be established between the system and a mobile terminal of a certain user. For example, if a home care patient is monitored with certain sensors and it is detected that a monitored value deviates from the default value, the system can establish a communication connection between the patient and nursing staff so that the status of the patient can be checked. The implementation of this may require that necessary contact details are stored in the database, e.g. into a user profile, so that the communication can be established. In establishing a communication connection it is possible to utilize so called push characteristics offered by a telecommunication network so that information can be delivered without an acceptance from the receiving party. In order to manage the information a predefined template may be utilized. The templates may be matched with the used technology, such as Web3 semantic so that transportation of information is simple and straightforward.

Similarly, the invention may be utilized in a so called autonomous system environment. With the autonomous system it is meant such an environment in which a device is configured to perform tasks without a continuous guidance of human. Thus, the invention as described may be arranged to monitor environment with at least one sensor and based on the sensor information create instructions to any device belonging to the system. The device is configured to interpret the instructions and change the operation according to the instructions. An example of such a system is a robot sorting a waste on a conveyor in which the operation of the robot is at least partly controlled by means of artificial intelligence.

FIG. 3 illustrates an example of a network element, such as a server, that comprises at least one processor unit 301 suitable for implementing one or more method steps as disclosed. In addition to the processor unit 301 (or Central Processor Unit; CPU) i.e. one or more processor(s), the server may comprise network connectivity elements 302, memory elements, such as random access memory (RAM) 303 and/or read only memory (ROM) 304, and input/output (I/O) devices 305. The server may further comprise a database 307 for storing at least part of information relating measurements and/or the mobile terminals residing in the area the server is serving. These components may communicate with one another via a bus 306. In some cases, at least some of these components can locate in a single physical entity or in more than one physical entity.

The processor unit 301 is configured to execute instructions, computer programs or scripts, which can be accessed via network connectivity elements 302, or from RAM 303 or ROM 304. While only one processor is disclosed in FIG. 3, multiple processors may be present.

The network connectivity elements 302 may comprise any means for implementing wired and/or wireless connectivity of the server, such as modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements at least enable the server to communicate with the corresponding external telecommunication networks or Internet or other networks or any other external network element or mobile terminals over preconfigured interfaces.

The memory element is configured to store at least computer program code, which may be utilized in implementation of the method according to the invention. For example, the RAM 303 can be used to store volatile data and instructions that are executed by the processor. The ROM 304 is a non-volatile memory and it is used to store instructions and perhaps data that are read during the execution of instructions. Furthermore, the memory elements 303 and 304 may be used for at least temporarily storing information e.g. from sensors.

The I/O devices 305 may include displays, touch screen displays, keyboards, keypads, switches, mice, track balls, voice recognizers, card readers, or other known I/O devices.

The database 307 may be implemented in the server coupled to it through the network connectivity elements 302. The database 307 may comprise at least part of the information relating to measurement results, such as values, and/or profiles as described and/or control information and/or location information of the mobile terminals and/or sensors.

According to the invention the server comprises software stored in the memory elements and the software or at least pieces of it when executed by the processor unit is configured to cause the server to implement at least part of the method steps described above. More specifically, the server for determining information for at least one mobile terminal within an area, wherein location of the at least one mobile terminal is determined within the area and measurement information from the area is retrieved from at least one sensor wherein the location of the sensor is known, is configured first to compare the retrieved measurement information of at least one sensor with at least one default value stored in a database for the at least one sensor and in response of a detection of a mismatch of the retrieved measurement information of at least one sensor with at least one default value stored in a database for the at least one sensor. Secondly, the server is configured to determine information relevant in the location of the at least one sensor whose measurement information is detected to mismatch with at least one default value stored in the database for the at least one sensor. Thirdly, the server is further configured to determine at least one mobile terminal residing within a predetermined distance from the location of the at least one sensor whose measurement information is detected to mismatch with at least one default value stored in the database for the at least one sensor, and finally the server is configured to initiate the delivery of the determined information relevant in the location of the at least one sensor whose measurement information is detected to mismatch with at least one default value stored in the database for the at least one sensor to the at least one mobile terminal residing within a predetermined distance from the location of the at least one sensor whose measurement information is detected to mismatch with at least one default value stored in the database for the at least one sensor.

As said, the server is further configured to the implement other method steps as described in the context of the description of the method above.

The invention also relates to a computer program product for determining information for at least one mobile terminal within an area, wherein location of the at least one mobile terminal is determined within the area and measurement information from the area is retrieved from at least one sensor wherein the location of the sensor is known. The computer program product comprises computer-executable instructions that when executed by processing element of a server, the server is configured to perform all the method steps described in the description herein.

The invention also relates to a system comprising at least one sensor, at least one mobile terminal and at least one server for implementing the method according to the invention.

Furthermore, in some embodiments of the invention it may be arranged that information from the sensors is collected and processed as described in a mobile terminal instead of one or more servers or in co-operation of one or more servers. The mobile terminal being responsible for collecting and processing the information according to the method of the invention is also configured to deliver instructions to most suitable other mobile terminal. Especially, the nanotechnology increases the computing capability of the mobile terminals and thus the mobile terminals may be configured to be capable of taking at least part of the operations of the server as disclosed in this context.

Some advantageous embodiments according to the invention were described above. The invention is not limited to the embodiments described. The inventive idea can be applied in numerous ways within the scope defined by the claims attached hereto.

The invention claimed is:

1. A method for determining information for at least one mobile terminal within an area, wherein a location of the at least one mobile terminal is determined within the area, measurement information from the area is retrieved from at least one sensor wherein the location of the sensor is known and the at least one sensor measures a parameter being affectable by at least one device, the method comprising:
   comparing the retrieved measurement information of at least one sensor with at least one default value stored in a database for the at least one sensor and in response of a detection of a mismatch of the retrieved measurement information of at least one sensor with at least one default value stored in a database for the at least one sensor;
   determining information comprising control information for the at least one device affecting to the parameter measured by the at least one sensor, whose measurement information is detected to mismatch with at least one default value stored in the database for the at least one sensor;
   determining at least one mobile terminal residing within a predetermined distance from the location of the at least one device affecting to the parameter measured by the at least one sensor, whose measurement information is detected to mismatch with at least one default value stored in the database for the at least one sensor; and
   initiating delivery of the determined information comprising control information for the at least one device affecting to the parameter measured by the at least one sensor, whose measurement information is detected to mismatch with at least one default value stored in the database for the at least one sensor, to the at least one mobile terminal residing within a predetermined distance from the location of the device affecting to the parameter measured by the at least one sensor whose measurement information is detected to mismatch with at least one default value stored in the database for the at least one sensor.

2. The method according to claim 1, wherein a profile is defined for at least one sub-area of the area.

3. The method according to claim 2, wherein the profile for at least one sub-area of the area comprises at least one identifier for at least one sensor by means of which measurement information on the at least one sensor is retrieved.

4. The method according to claim 3, wherein the default value for the at least one sensor is retrieved from the database on the basis of the at least one identifier in the profile for at least one sub-area of the area.

5. The method according to claim 1, wherein a predetermined margin is defined for the retrieved measurement information with respect to the default value in order to judge a mismatch in the comparison.

6. The method according to claim 1, wherein an identifier of a user of the mobile terminal is received from the mobile terminal.

7. The method according to claim 6, wherein the control information with respect to a device residing within a predetermined distance from the location of the at least one sensor whose measurement information is detected to mismatch with at least one default value stored in the database for the at least one sensor is defined at least partly on a basis of the identifier of the user of the mobile terminal.

8. The method according to claim 1, wherein in response of a detection of a mismatch of the retrieved measurement information of at least one sensor with at least one default value stored in a database for the at least one sensor initiating the monitoring of the at least one sensor more frequently.

9. The method according to claim 1, wherein a predetermined delay is defined after the detection of mismatch in the comparison before information to be delivered to the mobile terminal is determined.

10. The method according to claim 1, wherein the determination of at least one mobile terminal residing within a predetermined distance from the location of the at least one sensor whose measurement information is detected to mismatch with at least one default value stored in the database for the at least one sensor further comprises a step of determining a presence information of the mobile terminal.

11. A server, comprising:
   a processing unit; and
   a memory unit including computer program code recorded therein,
   the server configured to determine information for at least one mobile terminal within an area, wherein a location of the at least one mobile terminal is determined within the area and measurement information from the area is retrieved from at least one sensor wherein the location of the sensor is known and the at least one sensor is measuring a parameter being affectable by at least one device,
   wherein
   the memory unit and the computer program code are configured to, with the processing unit, cause the server at least to perform
      compare the retrieved measurement information of at least one sensor with at least one default value stored in a database for the at least one sensor and in response of a detection of a mismatch of the retrieved measurement information of at least one sensor with at least one default value stored in a database for the at least one sensor,
      determine information comprising control information for the at least one device affecting to the parameter measured by the at least one sensor, whose measurement information is detected to mismatch with at least one default value stored in the database for the at least one sensor, determine at least one mobile terminal residing within a predetermined distance from the location of the at least one device affecting to the parameter measured by the at least one sensor, whose measurement information is detected to mismatch with at least one default value stored in the database for the at least one sensor, and initiate delivery of the determined information comprising control information for the at least one device affecting to the parameter measured by the at least one sensor, whose measurement information is detected to mismatch with at least one default value stored in the database for the at least one sensor, to the at least one mobile terminal residing within a predetermined distance from the location of the device affecting to the parameter measured by the at least one sensor whose measurement information is detected to mismatch with at least one default value stored in the database for the at least one sensor.

12. The server according to claim 11, wherein the server is configured to store a profile for a subarea of the area, the profile comprising at least an identifier for the at least one sensor.

13. The server according to claim 11, wherein the server is configured to determine information to be delivered to the at least one mobile terminal on the basis of identifier of the user received from the at least one mobile terminal.

14. The server according to claim 11, wherein the server is configured to determine a presence information of the mobile terminal residing within a predetermined distance from the location of the at least one sensor whose measurement information is detected to mismatch with at least one default value stored in the database for the at least one sensor.

* * * * *